United States Patent [19]

Hammond et al.

[11] Patent Number: 5,530,808
[45] Date of Patent: Jun. 25, 1996

[54] SYSTEM FOR TRANSFERRING OWNERSHIP OF TRANSMITTED DATA PACKET FROM SOURCE NODE TO DESTINATION NODE UPON RECEPTION OF ECHO PACKET AT SOURCE NODE FROM DESTINATION NODE

[75] Inventors: William A. Hammond, Rochester; George W. Nation, Eyota; Daniel G. Young, Rochester, all of Minn.

[73] Assignee: International Business Machines Corporation, Armonk, N.Y.

[21] Appl. No.: 165,283

[22] Filed: Dec. 10, 1993

[51] Int. Cl.⁶ ................................................. G06F 13/00
[52] U.S. Cl. .................... 395/200.2; 370/60; 370/94.1; 364/222.2; 364/240.9; 364/284.4; 364/DIG. 1
[58] Field of Search ..................... 395/200, 200.01, 395/200.02, 200.12, 200.21; 370/60, 60.1, 85.4, 85.5, 85.13, 85.14, 85.6, 94.1

[56] References Cited

U.S. PATENT DOCUMENTS

| | | | |
|---|---|---|---|
| 4,539,679 | 9/1985 | Bux et al. | 370/85.4 |
| 4,567,590 | 1/1986 | Bederman | 370/85.15 |
| 4,577,313 | 3/1986 | Sy | 370/85.14 |
| 5,041,963 | 8/1991 | Ebersole | 370/60 |
| 5,115,495 | 5/1992 | Tsuchiya et al. | 395/200.15 |
| 5,235,595 | 8/1993 | O'Daud | 370/94.1 |
| 5,327,431 | 7/1994 | Heske et al. | 370/85.5 |
| 5,379,297 | 1/1995 | Glover et al. | 370/60.1 |
| 5,392,399 | 2/1995 | Gilbrech | 395/200.02 |
| 5,426,637 | 6/1995 | Derby et al. | 370/85.13 |
| 5,430,710 | 7/1995 | Mueller et al. | 370/60 |
| 5,432,907 | 7/1995 | Picazo et al. | 395/200.02 |

*Primary Examiner*—Thomas C. Lee
*Assistant Examiner*—Moustafa Mohamed Meky
*Attorney, Agent, or Firm*—Duke W. Yee; Andrew J. Dillon

[57] ABSTRACT

The present invention provides a method in a data processing system for efficiently sending a data packet from a source node to a destination node. The data processing system includes a multi-segment network having at least two segments, wherein the source node and the destination node are located within in different segments. Communication of a data packet from one segment to another segment is provided by an agent node. The present invention generates a data packet at the source node within a first segment on the multi-segment network. The data packet includes a source address, a destination address, and data. The data packet is then transmitted within the first segment and the source node retains ownership of the data packet. Thereafter, the data packet is received within the first segment at an agent node. The data packet is examined to determine the destination address and then transmit it to the destination node within a second segment in the multi-segment network. The data packet is thereafter received at the destination node within the second segment and an echo packet is automatically transmitted from the destination node to the source node to indicate a successful reception of the data packet and transferring ownership of the data packet from the source node to the destination node.

18 Claims, 10 Drawing Sheets

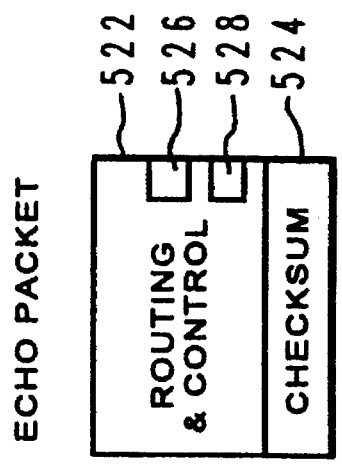
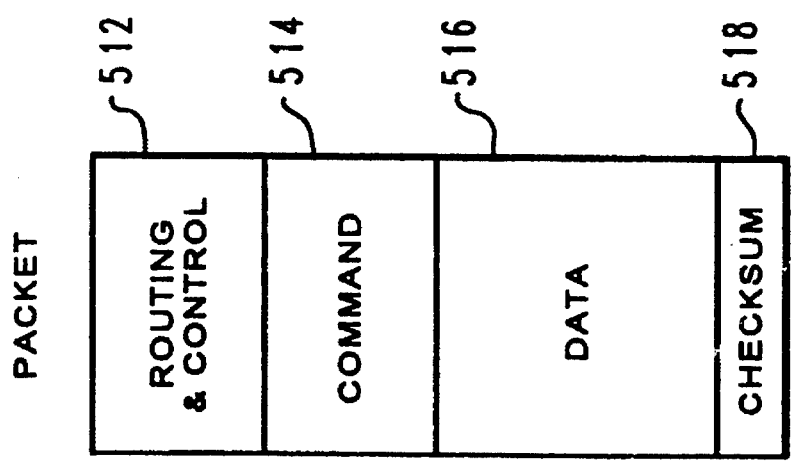

_5,530,808_

SYSTEM FOR TRANSFERRING OWNERSHIP OF TRANSMITTED DATA PACKET FROM SOURCE NODE TO DESTINATION NODE UPON RECEPTION OF ECHO PACKET AT SOURCE NODE FROM DESTINATION NODE

BACKGROUND OF THE INVENTION

1. Technical Field

The present invention relates generally to an improved distributed data processing system in particular to improved communication within a data processing system such as a multi-segment local area network. Still more particularly, the present invention relates to communication between nodes located in different segments in a multi-segment local area network.

2. Description of the Related Art

Data processing systems, such as computer networks are increasingly common in the modern workplace. Such networks typically include multiple workstations and host or server devices which may be distributed over a vast geographical distance. Such networks contains nodes; each node includes a communications control unit that is a unit that controls the transmission and reception of data in a network. The communications control unit may contain one or more ports. The node also may be a processing element, such as workstation or a personal computer. A processing element includes one or more processors, memory and a communications control unit. Simpler types of nodes such as, for example, a multiplexer, bridge, router, or terminal server may be used.

Many different topologies exist for connecting multiple computers into a distributed data processing system. One common technique for interconnecting multiple computers within a data processing system is to arrange the nodes in a ring structure. One known ring system is the so-called Token Ring local area network. The Token Ring local area network is defined by the I.E.E.E. 802.5 standard and is well known to those of ordinary skill in the art.

The SCI standard, I.E.E.E. std. 1596–1992, specifies that nodes in a network communicate via unidirectional rings. For larger systems, multiple interconnected rings may be employed such that the bandwidth function of a single ring does not create a bottleneck in communications within the network. As a result of such a system, packets may have to travel, from the source address, across several rings to reach a destination address. The "source address" is the node that originates the packet and the "destination address" is the node that is to receive the packet.

In sending packets, special nodes, also called "agent nodes" or "bridges" are employed to take a packet from one ring in the network and place the packet on to another ring in the network. The communications units in these nodes typically have two or more ports including an agent function. Under the SCI standard, anytime a packet is successfully received by a node either at its source address, destination address, or at an agent node, an "echo packet" is placed onto the ring as an indication to the transmitting node that the packet does not have to be retransmitted onto that ring. As a result, "ownership" or responsibility for a packet is transferred from node to node. If the receiving node is an agent node, it assumes the responsibility for ensuring that the packet is sent to the next node.

Problems, however, may occur when using agent nodes. For example, echo packets that are lost result in "confusion" over which node owns a packet. When an echo packet is lost, the destination node generating the echo packet has assumed ownership of the packet, while the node transmitting the packet still assumes that it has ownership of the packet because it has not received an echo packet. Consequently, the source node will eventually retry sending the packet. Thus, through a succession of errors it is possible that a number of different nodes will assume absolute ownership of the packet and attempt to transmit the packet to the destination address.

This situation can result in data integrity failure in a SCI standard network. SCI standard networks support shared coherent memory across many nodes. Thus, many of the packets are sent for the purpose of transferring ownership of data, purging, updating memory contents, etc. This type of coherent shared memory is sensitive to errant commands.

For example, execution of a command that transfers ownership of data two times could result in data integrity failure in a SCI standard network. In a situation in which two or more nodes have accepted ownership of a packet and each attempt to transmit the packet to the destination node, the original packet will be accepted and processed by the destination node. At a later time, a second packet, identical to the original packet, could be received and processed, possibly resulting in a data integrity failure in the SCI standard network. Therefore, it would be desirable to have a method and system for improving communications within a network employing agent nodes.

SUMMARY OF THE INVENTION

It is therefore one object of the present invention to provide an improved data processing system.

It is another object of the present invention to provide improved communication within a data processing system such as a multi-segment local area network.

It is yet another object of the present invention to provide improved communication between nodes located in different segments in a multi-segment local area network.

The foregoing objects are achieved as is now described. The present invention provides a method in a data processing system for efficiently sending a data packet from a source node to a destination node. The data processing system includes a multi-segment network having at least two segments, wherein the source node and the destination node are located within in different segments. Communication of a data packet from one segment to another segment is provided by an agent node. The present invention generates a data packet at the source node within a first segment on the multi-segment node. The data packet includes a source address, a destination address, and data. The data packet is then transmitted within the first segment. Thereafter, the data packet is received within the first segment at an agent node. The data packet is examined to determine the destination address and then transmit it to the destination node within a second segment in the multi-segment network. The data packet is thereafter received at the destination node within the second segment and an echo packet is automatically transmitted from the destination node to the source node to indicate a successful reception of the data packet.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 9 depicts a block diagram of a packet in accordance with a preferred embodiment of the present invention; and FIG. 10 depicts a block diagram of an echo packet in accordance with the preferred embodiment of the present invention.

DETAILED DESCRIPTION OF PREFERRED EMBODIMENT

Figure 1:
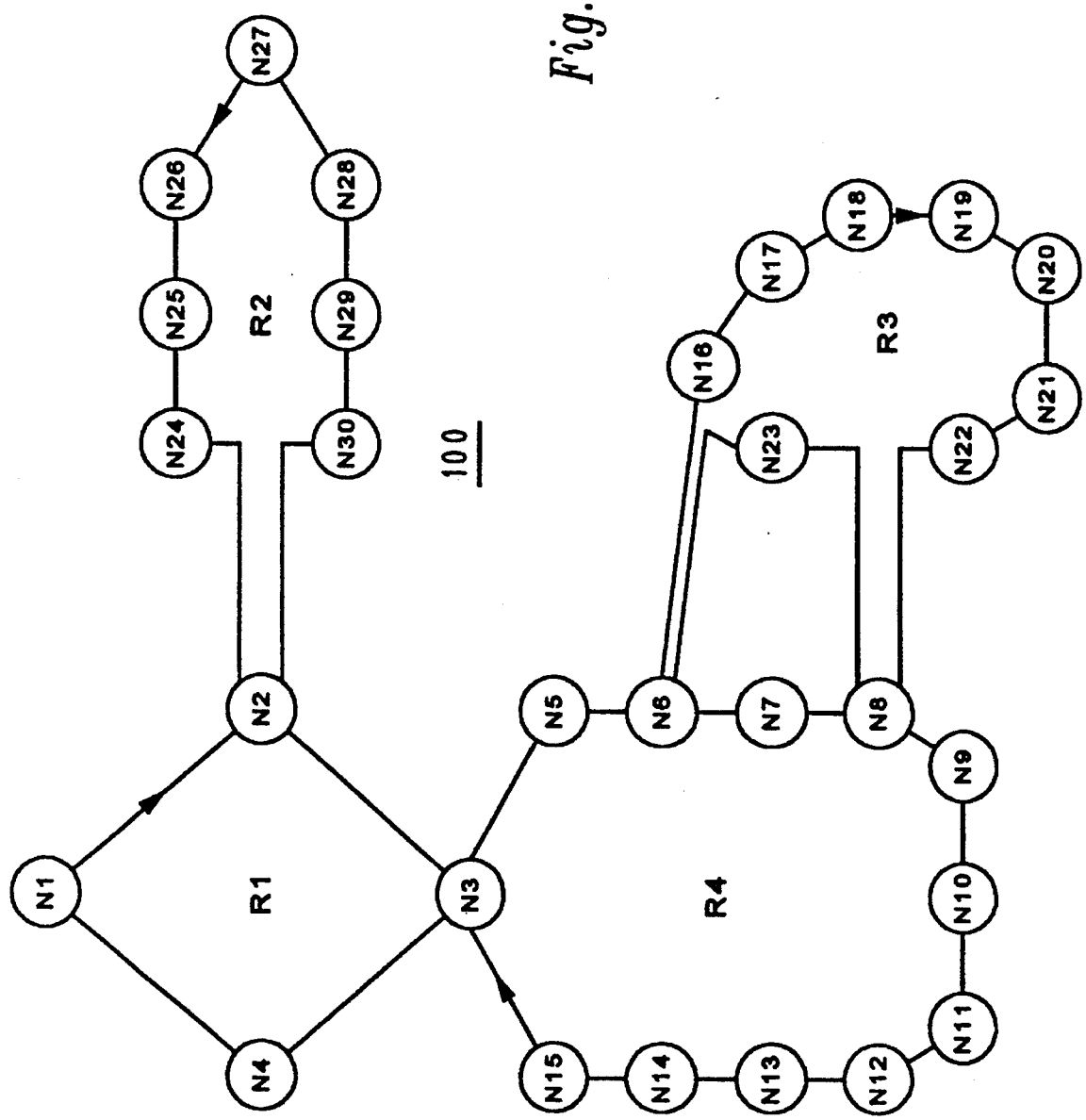
FIG. 1 is a block diagram of a data processing system configured as an interconnected ring in which a preferred embodiment of the present invention may be implemented.

With reference now to the figures and in particular with reference to FIG. 1, a block diagram of a interconnected ring 100 in which a preferred embodiment of the present invention may be implemented is illustrated. Interconnected ring 100 includes rings R1, R2, R3, and R4. Interconnected ring 100 contains 30 nodes, N1–N30. Nodes N2, N3, N6, and N8 act as agent nodes in interconnected ring 100. Rings R1–R4 in interconnected ring 100 are unidirectional rings and are also referred to as "segments" within interconnected ring 100.

Figure 2:
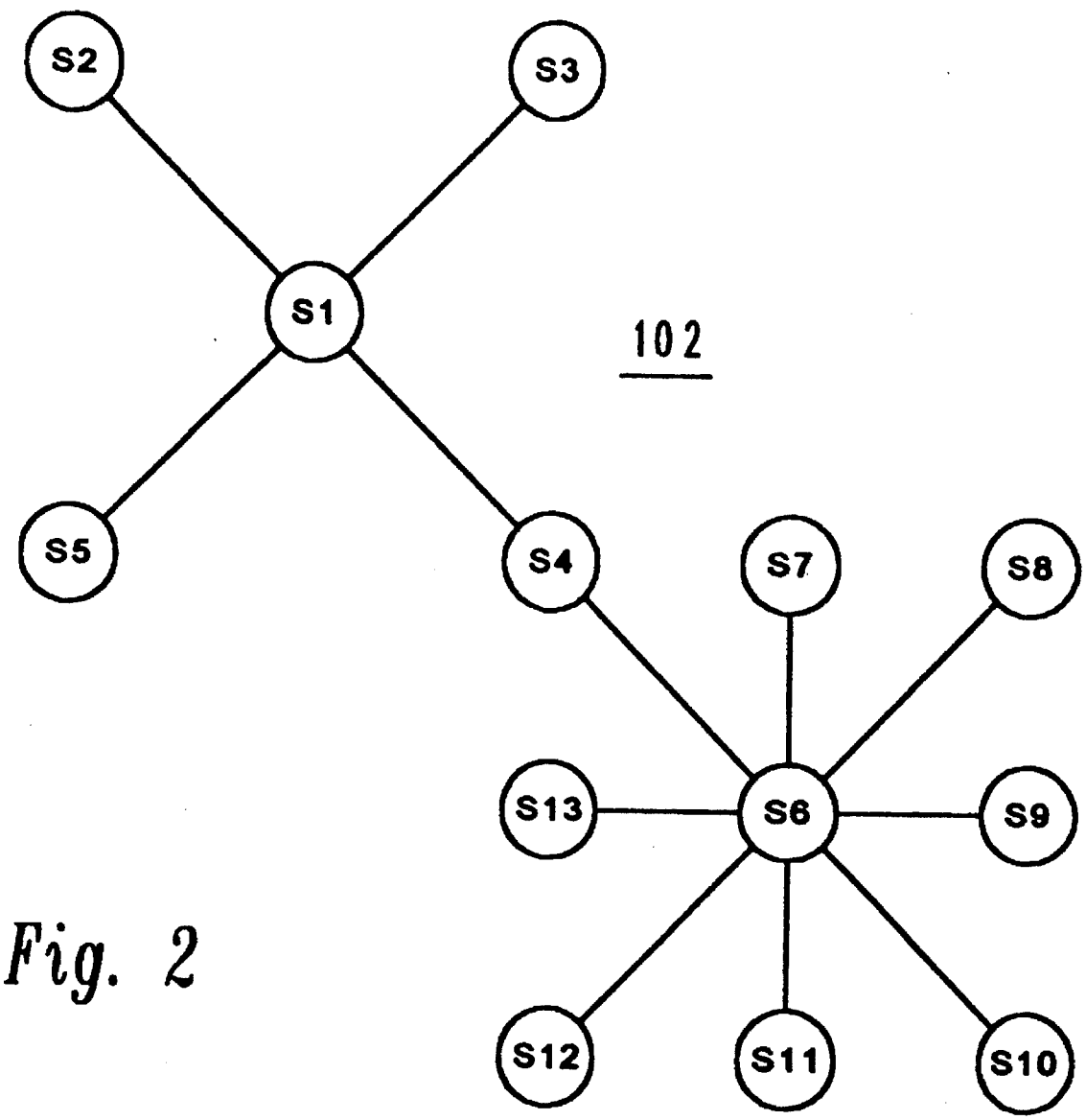
FIG. 2 depicts a block diagram of a data processing system configured as a star network in which a preferred embodiment of the present invention may be implemented.

Referring now to FIG. 2, a block diagram of a star network is depicted in which a preferred embodiment of the present invention also may be implemented. Star network 102 includes nodes S1–S13, which form segments within star network 102. Nodes S1 and S6 act as agent nodes to provide agent functions between various segments in this network configuration.

Figure 3:
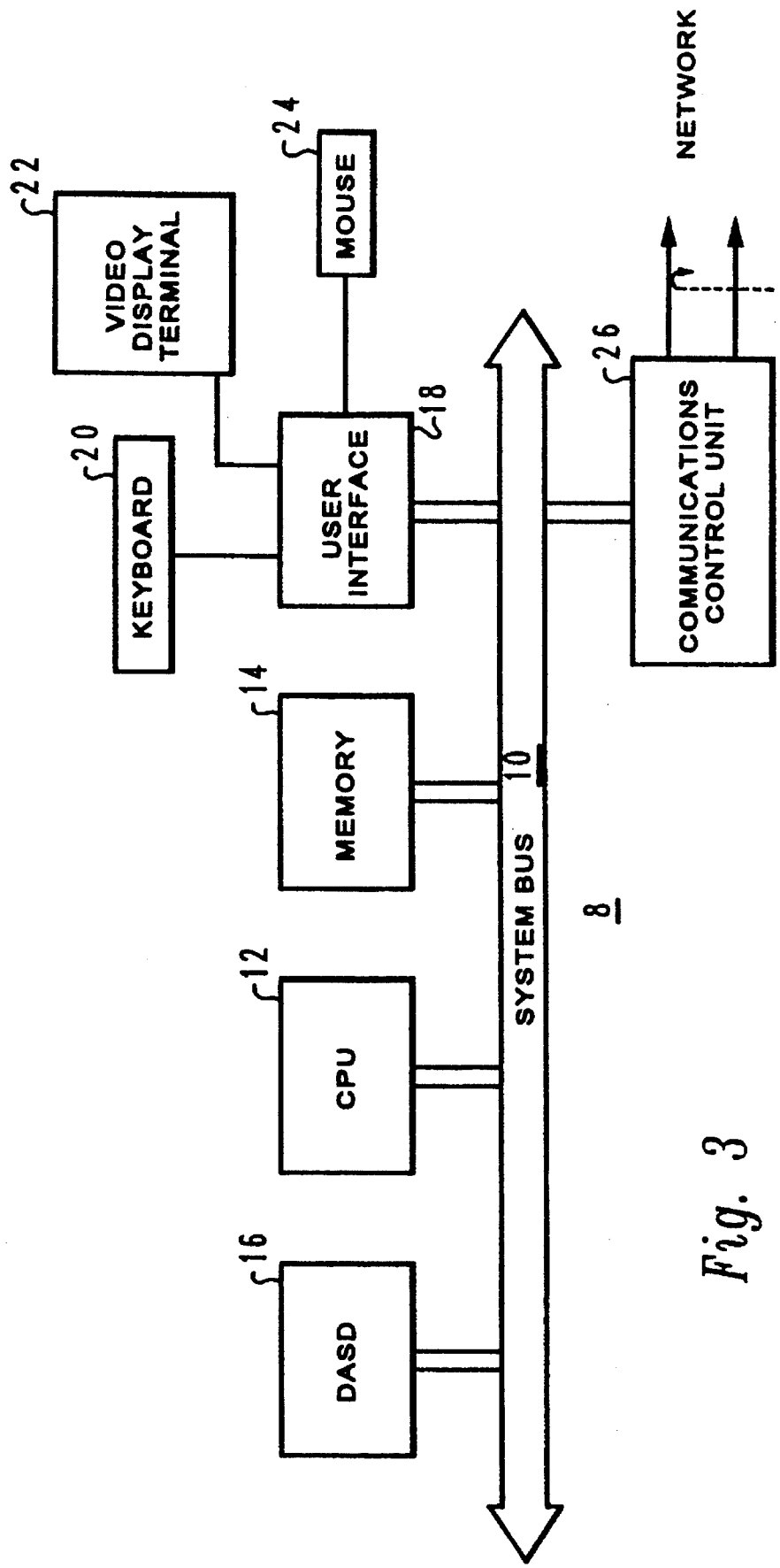
FIG. 3 is a block diagram of a data processing system which may be utilized as a node in a network in accordance with a preferred embodiment of the present invention.

Referring now to FIG. 3, a block diagram of a data processing system 8, which may be utilized as a node in a network, is illustrated in accordance with a preferred embodiment of the present invention. System bus 10 provides a connection between various components within data processing system 8. Central processing unit (CPU) 12 provides the decision making capability in data processing system 8. CPU 12 may include one or more processors, such as an 80486 processor available from Intel Corporation. Memory 14 provides storage for data processing system 8 and may includes both read only memory (ROM) and random access memory (RAM). Direct access storage device (DASD) 16 provides additional storage for data processing system 8. DASD 16 typically provides long term storage for data processing system 8. DASD 16 may include, for example, a hard disk drive and/or a floppy disk drive.

User interface 18 provides an interface between data processing system 8 and peripherals employed by a user to interact with data processing system 8. User interface 18 may include various adapters and drivers for driving peripherals, such as keyboard 20, video display terminal 22, and mouse 24.

Communications unit 26 provides the interface between data processing system 8 and the network to which it is connected to. Communications unit 26 may include a number of different ports, I to N. Communications unit 26 also may include one or more processors for handling communications activities, such as, for example receiving packets, examining packets, and/or transmitting packets within a network. Typically, data processing system 8 will include a single port that is connected to the network. When data processing system 8 is employed as an agent node, communications unit 26 will include two or more ports to provide connections to different parts or segments of the network.

According to the present invention, the problem of having multiple nodes assuming ownership of the same packet is eliminated by implementing a protocol that restricts the type of ownership that agent nodes may assume. In accordance with a preferred embodiment of the present invention, agent nodes do not retransmit a packet because of a lost echo packet. Instead, the present invention implements a mechanism in which only the source node originating the packet can retransmit a packet because of an error (i.e., lost packet or lost echo packet). In accordance with a preferred embodiment of the present invention, a node acting as an agent node for a packet does not accept ownership, (i.e., does not generate a non-busy echo packet). Non-busy echo packets are generated only at the destination node when the destination node receives the packet from the source node under the present invention. A node acting as an agent node will act as an agent node for non-busy echo packets (i.e., non-busy echo packets are routable). An agent node routes a non-busy echo packet as if it were a normal packet.

As a result, ownership of packets is not transferred node-to-node, but rather from the source node to the destination node via non-busy echo packets that are routed end-to-end in the system. Ownership is maintained by the source node until the destination node accepts the packet and returns a non-busy echo packet. Consequently, under the present invention, it is not possible for two nodes (one or more agent nodes) to each assume ownership of a packet and take responsibility for its routing towards the destination node. The source node is solely responsible for retrying or retransmitting the packet if the packet or its echo packet are corrupted in accordance with a preferred embodiment of the present invention. Thus, agent nodes are only responsible for a limited number of busy retries; they do not retry if an echo packet is lost. As a result, under a preferred embodiment of the present invention, it is not possible for a copy of a packet generated by an agent node to co-exist in the system with a packet generated by any other node, including the source node. Therefore, the situations in which the destination node must filter duplicate packets is greatly reduced.

In addition, the present invention provides a mechanism to inform the source node that the retry counter should not be reset when an agent node is forced to decline acceptance of a packet. Employing such a mechanism, the source node detect in a short interval time that a component in the packet's path to the destination node is faulty and report a recoverable error and then attempt to transmit the packet on an alternate path. Such a mechanism according to the present invention includes adding a single-bit field to the encoding of a busy echo packet. The bit is set if the busy echo packet is generated by an agent node and cleared if the busy echo packet is generated by a non-agent node, i.e., a destination node. Utilizing this single bit, a source node can determine whether or not to reset the retry counter for a packet. In accordance with a preferred embodiment of the present invention, the source node can detect a hardware fault located in a non-local ring in a fixed amount of time. The fixed amount of time is shorter than typical system-level timeout intervals. Consequently, a recoverable error can be reported and the system need not be brought down. Instead, a repair action may be called for if the faulty ring/component cannot be restarted. Typically, the field replaceable unit list generated for the repair action can be small and repairs can be scheduled when convenient to the network operators.

The processes depicted in FIGS. 4–8 below may be implemented by those of ordinary skill in the art within the data processing systems depicted in FIGS. 1–3.

Figure 4:
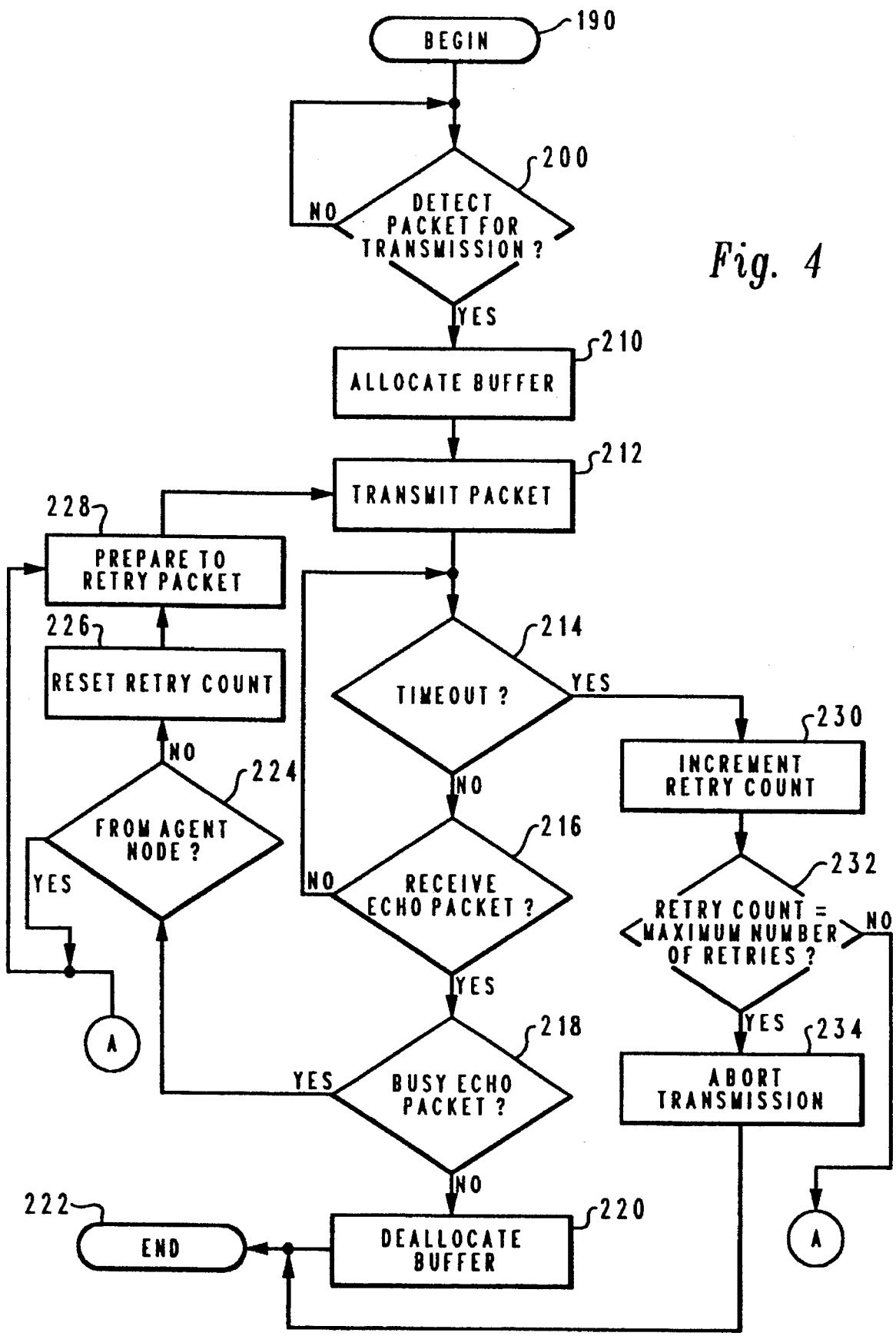
FIG. 4 depicts a high level flowchart of a process employed by source node to transmit packets to a destination node in accordance with a preferred embodiment of the present invention.

Referring now to FIG. 4, a flowchart of a process employed by a source node to transmit packets to a destination node is depicted. The process begins as illustrated in block 190 and thereafter proceeds to block 200, which depicts a determination of whether or not a packet for transmission has been detected. If a packet for transmission has not been detected, the process returns to block 200. Upon detection of a packet for transmission, the process then proceeds to block 210, which illustrates the allocation of a buffer for the packet. The process then advances to block 212. Block 212 illustrates the transmission of the packet. Thereafter, the process then proceeds to block 214, which depicts a determination of whether or not a timeout has occurred. A "timeout" is a bounded time interval measured from the most recent transmission of a packet. If a timeout has not occurred, the process then advances to block 216.

Block 216 illustrates a determination of whether or not an echo packet has been received. If an echo packet has not been received, the process returns to block 214 for a determination of whether a timeout has occurred. Upon the reception of an echo packet, the process then advances to block 218, which depicts a determination of whether the packet received is a busy echo packet. The reception of a non-busy echo packet results in the process deallocating the buffer used to store the packet that was transmitted, as illustrated in block 220. Thereafter, the process terminates as depicted in block 222.

Referring back to block 218, upon the reception of a busy echo packet, the process then advances to block 224, which illustrates a determination of whether or not the busy echo packet was received from an agent node. If the busy echo packet was not from an agent node, the process then proceeds to block 226, which depicts resetting the retry count. The count is reset to zero when a busy echo packet has been received by a node on the local ring, but the node does not have enough memory to accept the packet. Afterward, the process then moves to block 228, which illustrates preparing to retry transmission of the packet. The process then returns to block 212 for transmission of the packet. Referring back to block 224, if the busy echo packet was received from an agent node, the process then proceeds directly to block 228 to prepare to retry transmission of the packet to the destination node. In preparing to retry transmission of a packet, the source node waits for some selected amount of time before retransmitting the packet.

Referring back to block 214, if a timeout has occurred, the process then advances to block 230, which depicts incrementing the retry count. When a timeout has occurred while waiting for an echo packet, the source node assumes that the packet has been lost. Block 232 illustrates a determination of whether the retry count equals the maximum number of retries. If the answer to this determination is yes, the process then advances to block 234, which depicts the aborting any further tries at transmitting the packet to the destination node. Thereafter, the process terminates in block 222. Referring back to block 232, if the retry count does not equal the maximum number of retries, the process then proceeds to block 228 to prepare to retry transmission of the packet to the destination node.

Figure 5A:
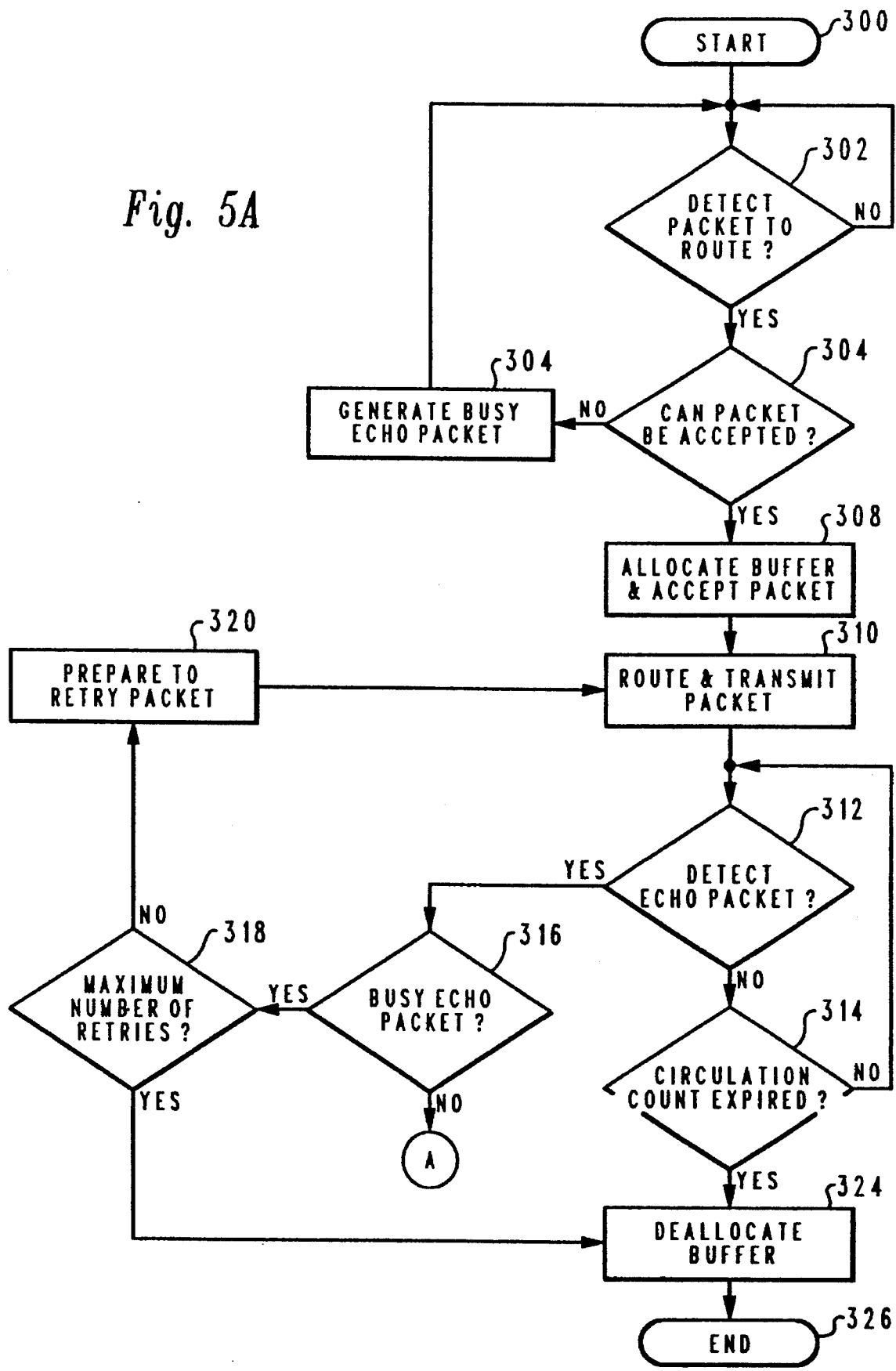
FIGS. 5A and 5B illustrate a high level flowchart of a process employed by an agent node in handling packets transmitted from a source node to a destination node in accordance with a preferred embodiment of the present invention.
Figure 5B:
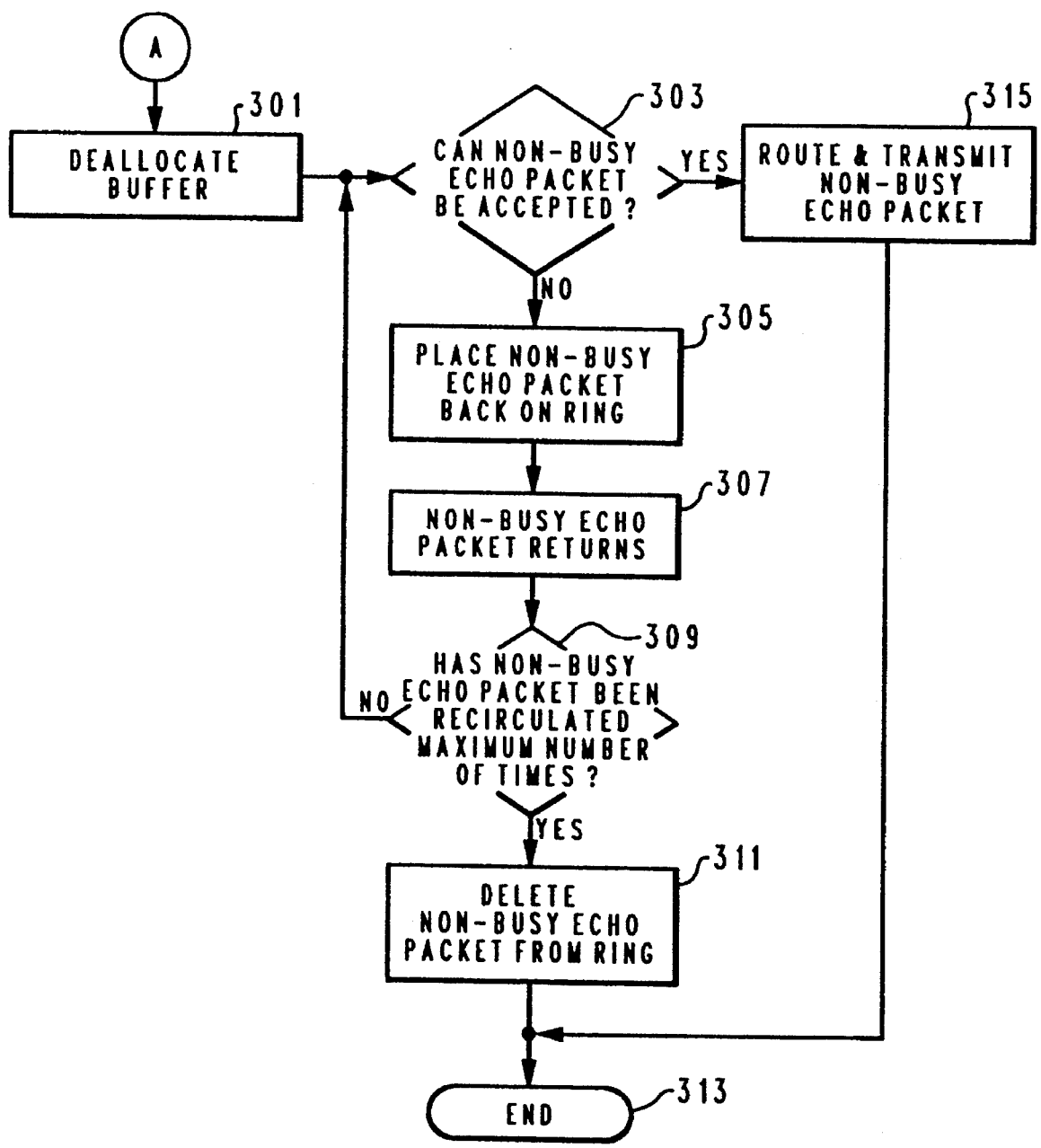

Referring next to FIGS. 5A and 5B, a flowchart of a process followed by an agent node in handling packets being transmitted from a source node to a destination node is illustrated. As depicted, the process begins in block 300 and thereafter proceeds to block 302, which illustrates a determination of whether or not a packet for routing has been detected. The process continues to return to block 302 until a packet for routing has been detected. Upon detection of a packet for routing, the process then advances to block 304. Block 304 depicts a determination of whether or not the packet can be accepted by the agent node. If the packet cannot be accepted, the process then proceeds to block 306, which illustrates the generation of a busy echo packet. The process then returns to block 302.

Referring back to block 304, if the packet can be accepted, the process then proceeds to block 308. Block 308 depicts the allocation of a buffer for the packet and the acceptance of the packet. The packet is stored in the allocated buffer. Thereafter, the process proceeds to block 310, which illustrates the routing and transmission of the packet. Routing a packet involves examining the packet and determining where the packet should be sent.

The process then proceeds to block 312, which depicts a determination of whether or not an echo packet associated with the packet transmitted in block 31 0 has been detected. Typically, the agent node, routing the packet to the destination node, also will route the echo packet back to the source node. If an echo packet is not detected, the process then proceeds to block 314, which illustrates a determination of whether or not the circulation count has expired. If the circulation count has not expired, the process then returns to block 312. The term "circulation count" is well known by those of ordinary skill in the art and relates to the transition of a circulation count bit within a ring in a network and how packets traveling within a ring are tracked.

Upon detection of an echo packet, the process then proceeds to block 316. Block 316 depicts a determination of whether or not the echo packet detected is a busy echo packet. If a busy echo packet is detected, the process then advances to block 318, which illustrates a determination of whether or not the maximum number of retries has been met. If the maximum number of retries has not occurred, the process then advances to block 320, which depicts preparing to retry transmission of the packet. The process then returns to block 310 for routing and transmission of the packet.

Referring back to block 316, if the packet detected is not a busy echo packet, the process then advances to block 301, which depicts deallocating the buffer used to store the packet. Thereafter, the process proceeds to block 303. Block 303 illustrates a determination of whether the non-busy echo packet can be accepted. If the non-busy echo packet cannot be accepted, the process then proceeds to block 305, which depicts the placement of the non-busy echo packet back onto the ring from which the non-busy echo packet was detected. The process then advances to block 307, which illustrates the return of the non-busy echo packet to the agent node after recirculating around the ring. Block 309 illustrates a determination of whether the non-busy echo packet has been recirculated a maximum number of times. If the non-busy echo packet has not been recirculated the maximum number of times, the process returns to block 303. Otherwise, the process advances to block 311. Block 311 illustrates deleting the non-busy echo packet from the ring. Thereafter, the process terminates as depicted in block 313.

Referring again to block 303, if the non-busy echo packet can be accepted, the process then proceeds to block 315 and the non-busy echo packet is routed and transmitted as depicted in block 315. Afterward, the process terminates in block 313. Next, referring back to block 314, if the circulation count has expired, the process proceeds to block 324 and the buffer storing the packet is deallocated with the process thereafter terminating as illustrated in block 326.

Figure 6:
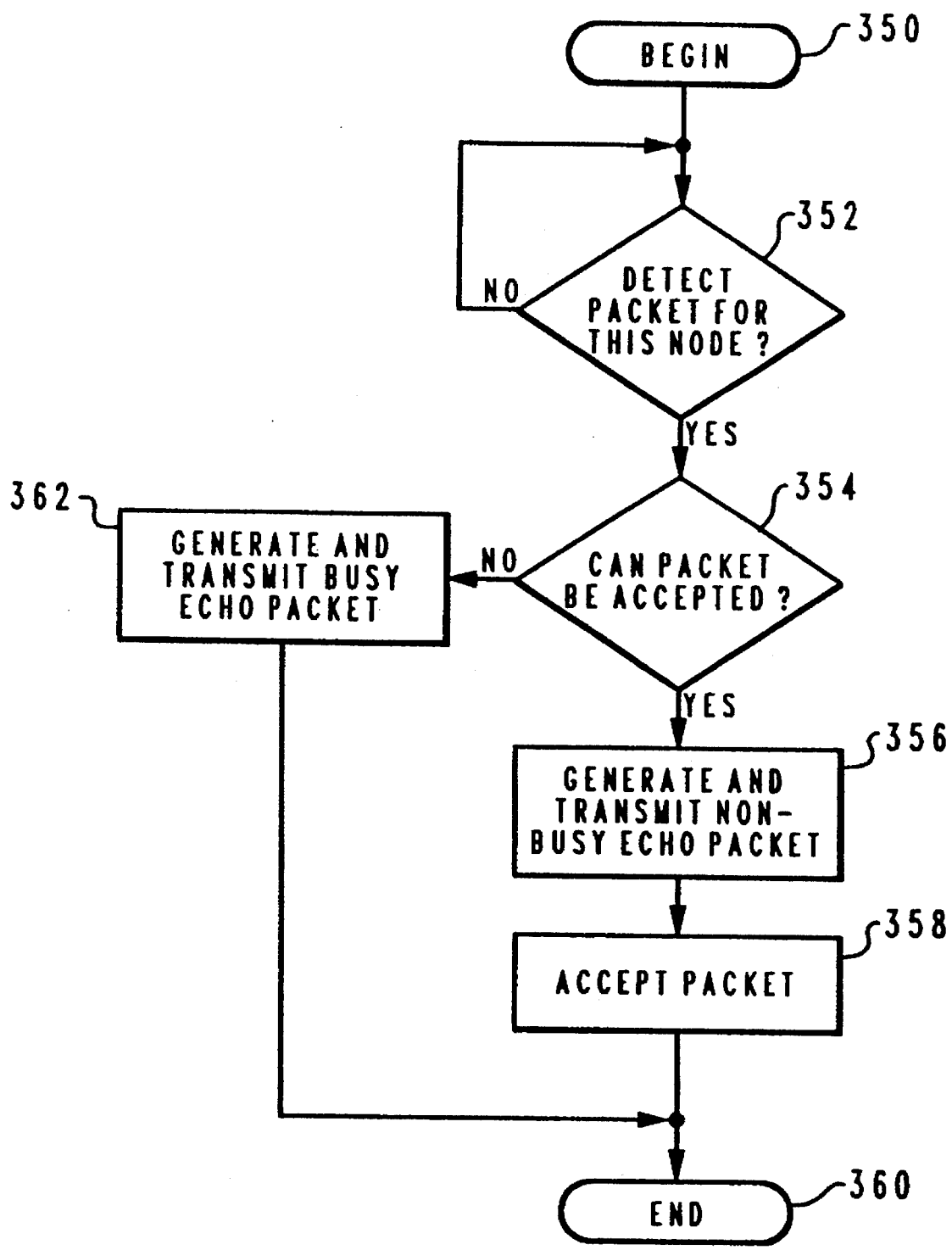
FIG. 6 depicts a high level flowchart for a process employed by a destination node to accept packets in accordance with a preferred embodiment of the present invention.

Referring now to FIG. 6, a flowchart for a process utilized by a destination node to accept packets in accordance with a preferred embodiment of the present invention is illustrated. The process begins as depicted in block 350 and thereafter proceeds to block 352, which illustrates a determination of whether a packet destined for this node has been detected. The process returns to block 352 until the detection of a packet for this node.

Upon a detection of a packet for this node, the process then proceeds to block 354. Block 354 depicts a determination of whether or not the packet can be accepted. If the packet can be accepted, the process then proceeds to block 356, which illustrates the generation and transmission of a non-busy echo packet. The process then advances to block 358, which depicts accepting the packet. Thereafter the process terminates as illustrated in block 360.

Referring back to block 354, if the packet cannot be accepted, a busy echo packet is generated and transmitted as depicted in block 362.

Figure 7:
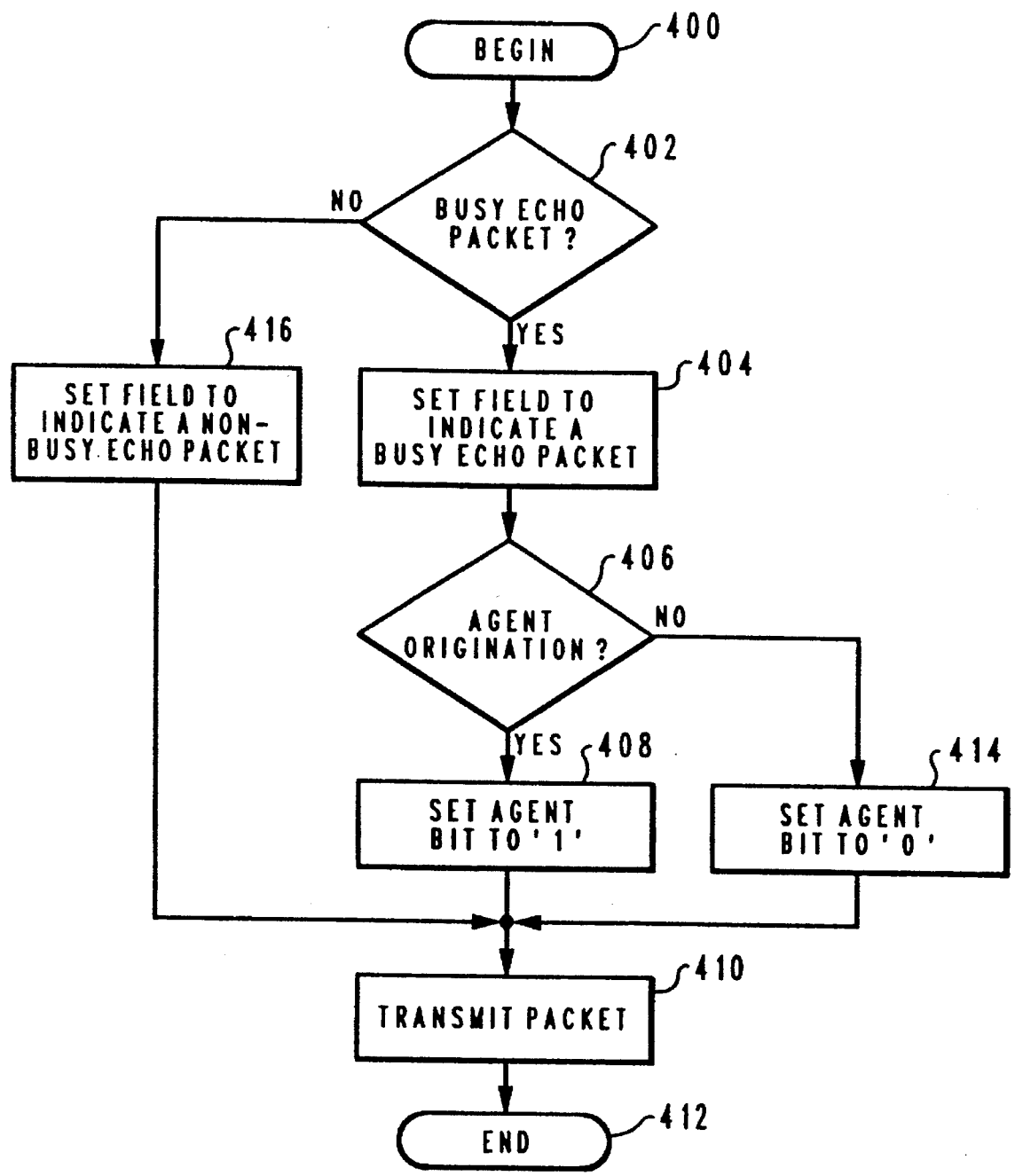
FIG. 7 is a high level flowchart of a process for generating echo packets in accordance with a preferred embodiment of the present invention.

With reference to FIG. 7, a flowchart of a process for generating echo packets is depicted in accordance with a preferred embodiment of the present invention. The process begins as illustrated in block 400 and thereafter proceeds to block 402, which depicts a determination of whether a busy echo packet is to be generated. If a busy echo packet is to be generated, the process then advances to block 404, which illustrates setting the identification field to indicate a busy echo packet. Thereafter, the process then proceeds to block 406. Block 406 depicts a determination of whether or not the busy echo packet originates from an agent node. If the busy echo packet is originating from an agent node, the process then advances to block 408, which depicts setting the "agent bit" in the busy echo packet to a logic one. Thereafter, the process proceeds to block 410, which illustrates the transmission of the busy echo packet with the process terminating thereafter in block 412.

Referring back to block 406, if the node is not an agent node the process then advances to block 414, which depicts setting the agent bit in the busy echo packet to a logic zero. Thereafter, the process then transmits the busy echo packet in block 410 and thereafter terminates as illustrated in block 412.

Referring back to block 402, if the echo packet is not a busy echo packet, the process then proceeds to block 416, which illustrates setting the identification field in the packet to indicate a non-busy echo packet. Thereafter the process transmits the echo packet in as illustrated in block 410 and terminates as depicted in block 412.

Figure 8:
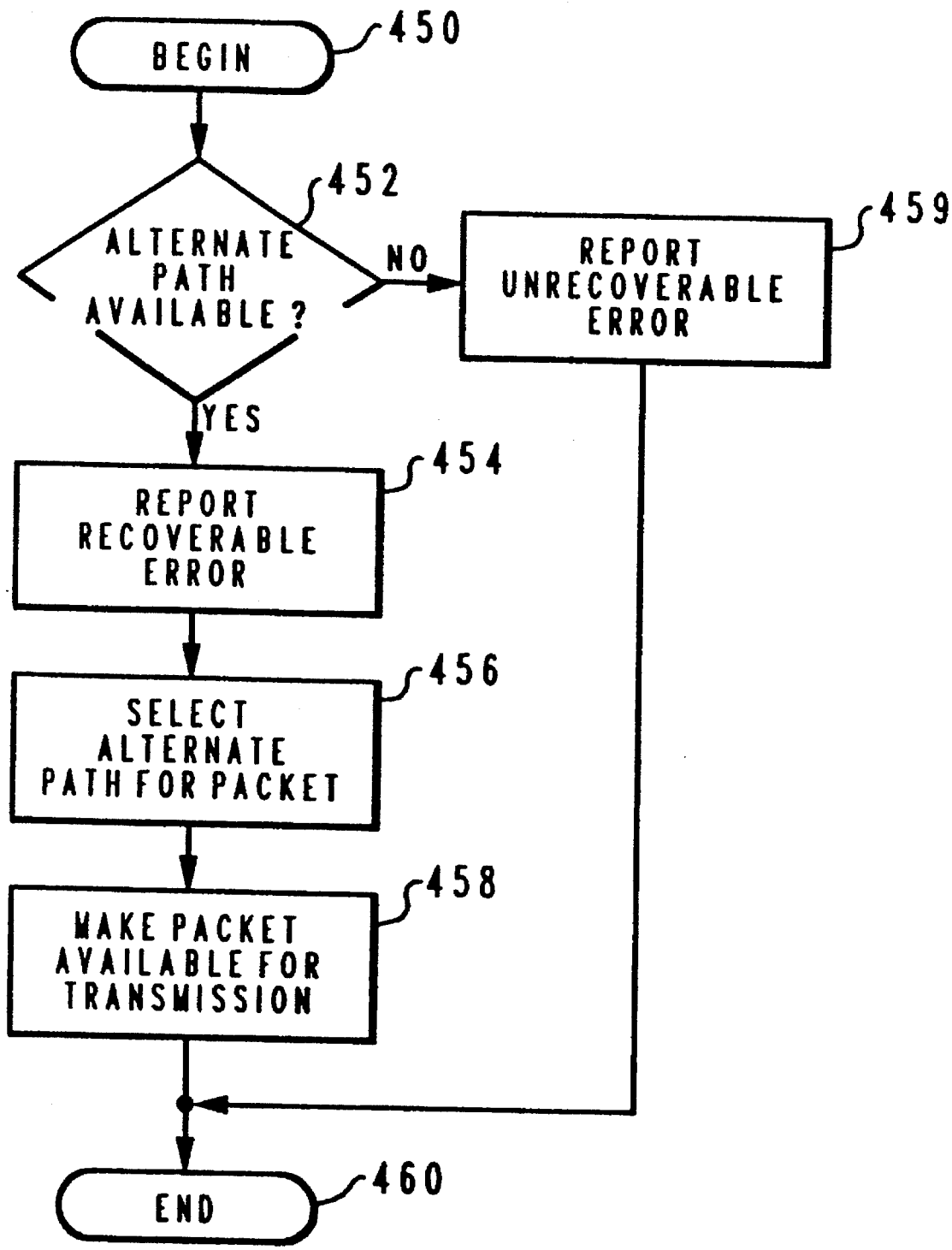
FIG. 8 depicts a high level flowchart of a process for handling transmissions aborted by a retry count equaling the maximum number of retries in accordance with a preferred embodiment of the present invention.

Referring next to FIG. 8, a process for handling transmissions aborted by a retry count equaling the maximum number of retries is depicted in accordance with the preferred embodiment of the present invention. As illustrated, the process begins in block 450 and thereafter proceeds to block 452. The process determines whether an alternate path to the destination node is available in the network, as illustrated in block 452. If alternate path exists the process proceeds to block 454. Block 454 depicts the reporting of a recoverable error. The process then proceeds to block 456, which depicts the selection of the alternate path for the packet. The process then makes the packet available for transmission as illustrated in block 458. Thereafter, the process terminates as depicted in block 460.

Referring again to block 452, if an alternate path is not available, the process also proceeds to block 459, which depicts the report of an unrecoverable error and then the process terminates in block 460. Making the packet available for transmission results in the process for transmitting a packet as illustrated in FIG. 4 being initiated.

Thus, according to a preferred embodiment of the present invention, data integrity problems may be eliminated in networks employing agents.

In addition, echo packets are routed at a higher priority than other packets by agent nodes. An agent node maintains a separate queue for echo packets. Also, when a packet cannot be accepted, the agent node reduces a "time of removal" field, also called a circulation count, in the packet before placing it back on to the ring, as illustrated in FIG. 5B. In the rare case that the field underflows, the echo packet is dropped and the normal loss-echo recovering mechanisms are initiated.

In addition, the present invention provides for a busy echo packet a single-bit field is added to the encoding of a busy echo packet. This "agent bit" is set if the busy echo packet was generated by an agent node and cleared if the busy echo packet was generated by a non-agent node. Using this single bit, a source node can determine that it either should or should not reset its retry counter for a packet in the retry cycle. This mechanism guarantees that the source node will detect a hardware fault in a fixed amount of time when some non-local ring is faulty. The fixed amount of time is set to be shorter than system-level time out intervals in accordance with a preferred embodiment of the present invention. As a result, a recoverable error can be reported by the interface and the system need not be brought down.

The processes depicted in the flowcharts of FIGS. 4–7 may be implemented within data processing system 8 depicted in FIG. 3. For example, the processes may be implemented within CPU 12 or within communications unit 26 in accordance with the preferred embodiments of the present invention.

Referring now to FIG. 9, a block diagram of a packet in accordance with a preferred embodiment of the present invention is depicted. Packet 510, also called a "data packet", includes routing and control information in section 512. This information is at the start of the packet. A command may be found in section 514 and data may be found in section 516. Commands in section 514 may include, for example, commands transferring ownership of data or manipulating data. A checksum may be found in section 518 at the end of the packet. The routing and control information in section 512 is used by the nodes to route packets and uniquely identify packets. The information in sections 514 and 516 are used by higher level logic portions of the node. The higher level commands and any data are encapsulated in these sections. The checksum information in section 518 is used for error detection.

Referring now to FIG. 10, a block diagram of an echo packet in accordance with a preferred embodiment of the present invention is illustrated. Echo packet 520 includes routing and control information in section 522 and checksum information in section 524. Within section 522, agent bit 526 is used to designate whether the busy echo packet originates from an agent or from a non-agent in accordance with a preferred embodiment of the present invention. If the bit is set to zero the busy echo packet is not from an agent, and if the bit is set to one, the busy echo packet is from an agent in accordance with a preferred embodiment of the present invention. In addition, bit 528 is a bit indicating whether echo packet 510 is a busy echo packet. The bit is set to a one if the echo packet is a busy echo packet otherwise bit 528 is set to a zero to indicate that echo packet 520 is a non-busy echo packet.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for efficiently sending a data packet from a source node to a destination node, wherein data processing system includes a multi-segment network having at least two segments, wherein said source node and said destination node are located within different segments and wherein communication of a data packet from one segment to another segment is provided by an agent node, said method comprising:

generating a data packet at said source node within a first segment on said multi-segment network wherein said data packet includes a source address, a destination address, and data;

having said source node retain ownership of said data packet after transmission of said data packet;

transmitting said data packet within said first segment;

receiving said data packet within said first segment at an agent node, examining said data packet to determine said destination address;

transmitting said data packet from said agent node to said destination node within a second segment in said multi-segment network;

receiving said data packet at said destination node within said second segment;

automatically transmitting an echo packet from said destination node to said source node to indicate a successful reception of said data packet in response to receipt of said data packet at said destination node;

receiving said echo packet at said source node within said first segment; and transferring ownership of said data packet from said source node to said destination node upon the reception of said echo packet at said source node.

2. The method of claim 1, wherein said step of generating a data packet includes generating a data packet having a command to transfer ownership of data.

3. The method of claim 1, wherein said step of generating a data packet includes generating a data packet having a command to manipulate data.

4. The method of claim 1, wherein said step of transmitting said data packet from said agent node to said destination node further includes:

transmitting said data packet to said destination node utilizing a first path;

in response to receipt of a busy echo packet originating from a second agent node on said first path a predetermined number of times, retransmitting said data packet to said destination node via a third agent on an alternate path.

5. A data processing system for efficiently sending a data packet from a source node to a destination node, wherein data processing system includes a multi-segment network having at least two segments, wherein said source node and said destination node are located within different segments and wherein communication of a data packet from one segment to another segment is provided by an agent node, said data processing system comprising:

generation means for generating a data packet at said source node within a first segment on said multi-segment network wherein said data packet includes a source address, a destination address, and data;

transmission means for transmitting said data packet within said first segment wherein said source node retains ownership of said data packet after transmission of said data packet;

said agent node including:
reception means for receiving said data packet within said first segment at an agent node;
examination means for examining said data packet to determine said destination address; and
transmission means for transmitting said data packet to said destination node within a second segment in said multi-segment network utilizing said destination address;

reception means for receiving said data packet at said destination node within said second segment;

automatic transmission means for automatically transmitting an echo packet from said destination node to said source node to indicate a successful reception of said data packet in response to receipt of said data packet at said destination node;

reception means for receiving said echo packet at said source node within said first segment; and ownership transferring means for transferring ownership of said source packet from said source node to said destination node upon the reception of said echo packet at said source node.

6. The data processing system of claim 5, wherein said multi-segment network comprises a plurality of interconnected rings.

7. The data processing system of claim 5, wherein said multi-segment network is a star network.

8. The data processing system of claim 5, wherein said data in said data packet includes a command transferring ownership of data.

9. The data processing system of claim 5, wherein said transmission means includes:

means for transmitting said data packet to said destination node utilizing a first path; and retransmission means for retransmitting said data packet to said destination node utilizing said first path in response to receiving a busy echo packet at the source node.

10. The data processing system of claim 9, wherein said retransmission means includes means for retransmitting said data packet to said destination node utilizing an alternate path in response to receiving a busy echo packet, from a second agent node on said first path that is located on a segment other than said first segment, a predetermined number of times.

11. The data processing system of claim 9, wherein said retransmission means includes means, responsive to receipt of a busy echo at said source node form said destination node, for retransmitting said data packet to said destination node after a predetermined time.

12. A data processing system comprising:

a plurality of segments, each segment including a number of nodes, at least one agent node and being connected to another segment in said plurality of segments;

a source node;

an agent node;

a destination node;

said source node located on a first of said plurality of segments, said source node including:

generation means for generating a packet, wherein said packet includes a source address and a destination address, ownership retention means for retaining ownership of said packet after transmission of said packet, transmission means for transmitting said packet onto said one of said plurality of segments, reception means for receiving an echo packet, and ownership transfer means for transferring ownership of said packet from said source node to said destination node upon the reception of an echo packet by said source node;

said agent node connecting said first of said plurality of segments with a second of said plurality of segments wherein said agent node includes:

reception means for receiving said packet, examination means for examining said packet to determine said destination address, and routing means for routing said packet onto said second of said plurality of segments; and said destination node including: reception means for receiving said packet, generation means for generating an echo packet including said source node as a destination address, and transmission means for transmitting said echo packet onto said second segment.

13. The data processing system of claim 12, wherein said segments are rings in an interconnected ring network.

14. The data processing system of claim 13, wherein said rings are unidirectional rings.

15. The data processing system of claim 12, wherein said segments are segments in a star network.

16. The data processing system of claim 12, wherein said transmission means in said source node transmitted said packet towards said destination node on a first path and wherein said source node further includes:

first retransmission means for retransmitting said packet to said destination node utilizing said first path in response to receiving a busy echo packet; and second retransmission means for retransmitting said packet to said destination node utilizing a second path in response to receiving an busy echo packet from an agent node a predetermined number of times.

17. The data processing system of claim 16, wherein a busy echo packet includes origination data indicating what type of node generated said busy echo packet.

18. The data processing system of claim 16, wherein said agent node further includes:

determination means, responsive to receipt of a non-busy echo packet from a segment, for determining whether said agent node can accept said non-busy echo packet;

placement means for placing said non-busy echo packet back onto said segment to recirculate said non-busy echo packet in response to a determination of an inability of said agent node to accept said non-busy echo packet;

tracking means for tracking a number of times that a non-busy echo packet is placed back onto a segment for recirculation;

routing means, responsive to an ability of said agent node to accept said non-busy echo packet, for routing said non-busy echo packet; and deletion means for deleting said non-busy echo packet in response to said number of times being equal to a predetermined number.

\* \* \* \* \*